(12) United States Patent
Han et al.

(10) Patent No.: US 8,631,300 B2
(45) Date of Patent: Jan. 14, 2014

(54) SYSTEMS AND METHODS FOR SCALABLE DATA PROCESSING SHUT DOWN

(75) Inventors: Yang Han, Sunnyvale, CA (US); Shaohua Yang, San Jose, CA (US); Zhi Kai Chen, Shanghai (CN); Lei Wang, Shanghai (CN); Changyou Xu, Fremont, CA (US)

(73) Assignee: LSI Corporation, San Jose, CA (US)

( * ) Notice: Subject to any disclaimer, the term of this patent is extended or adjusted under 35 U.S.C. 154(b) by 211 days.

(21) Appl. No.: 13/316,741

(22) Filed: Dec. 12, 2011

(65) Prior Publication Data

US 2013/0151923 A1    Jun. 13, 2013

(51) Int. Cl.
 *H03M 13/00*    (2006.01)
(52) U.S. Cl.
 USPC .......................................... 714/760; 714/24
(58) Field of Classification Search
 USPC ........... 713/300; 359/296; 711/154; 718/104; 714/752, 760, 24, 758
 See application file for complete search history.

(56) References Cited

U.S. PATENT DOCUMENTS

| | | |
|---|---|---|
| 5,278,703 A | 1/1994 | Rub et al. |
| 5,278,846 A | 1/1994 | Okayama |
| 5,317,472 A | 5/1994 | Schweitzer, III |
| 5,325,402 A | 6/1994 | Ushirokawa |
| 5,392,299 A | 2/1995 | Rhines |
| 5,417,500 A | 5/1995 | Martinie |
| 5,513,192 A | 4/1996 | Janku |
| 5,523,903 A | 6/1996 | Hetzler |
| 5,550,810 A | 8/1996 | Monogioudis et al. |
| 5,550,870 A | 8/1996 | Blaker |
| 5,612,964 A | 3/1997 | Haraszti |
| 5,710,784 A | 1/1998 | Kindred |
| 5,717,706 A | 2/1998 | Ikeda |
| 5,802,118 A | 9/1998 | Bliss |
| 5,844,945 A | 12/1998 | Nam |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | Mccalissister |
| 6,023,783 A | 2/2000 | Divsalar |
| 6,029,264 A | 2/2000 | Kobayashi |
| 6,065,149 A | 5/2000 | Yamanaka |
| 6,097,764 A | 8/2000 | McCallister |
| 6,145,110 A | 11/2000 | Khayrallah |
| 6,216,249 B1 | 4/2001 | Bliss |
| 6,216,251 B1 | 4/2001 | McGinn |
| 6,266,795 B1 | 7/2001 | Wei |
| 6,317,472 B1 | 11/2001 | Choi |
| 6,351,832 B1 | 2/2002 | Wei |
| 6,377,610 B1 | 4/2002 | Hagenauer |
| 6,381,726 B1 | 4/2002 | Weng |
| 6,473,878 B1 | 10/2002 | Wei |

(Continued)

OTHER PUBLICATIONS

Casado et al., Multiple-rate low-density parity-check codes with constant blocklength, IEEE Transations on communications, Jan. 2009, vol. 57, pp. 75-83.

(Continued)

*Primary Examiner* — David Ton
(74) *Attorney, Agent, or Firm* — Hamilton DeSanctis & Cha

(57) ABSTRACT

The present inventions are related to systems and methods for data processing, and more particularly to systems and methods for power governance in a data processing system.

20 Claims, 8 Drawing Sheets

(56) References Cited

U.S. PATENT DOCUMENTS

| | | | |
|---|---|---|---|
| 6,535,553 | B1 | 3/2003 | Limberg et al. |
| 6,625,775 | B1 | 9/2003 | Kim |
| 6,748,034 | B2 | 6/2004 | Hattori |
| 6,757,862 | B1 | 6/2004 | Marianetti, II |
| 6,785,863 | B2 | 8/2004 | Blankenship |
| 6,810,502 | B2 | 10/2004 | Eidson |
| 6,970,511 | B1 | 11/2005 | Barnette |
| 6,986,098 | B2 | 1/2006 | Poeppelman |
| 6,996,745 | B1 * | 2/2006 | Shaylor ............................ 714/24 |
| 7,047,474 | B2 | 5/2006 | Rhee |
| 7,058,873 | B2 | 6/2006 | Song |
| 7,073,118 | B2 | 7/2006 | Greenberg |
| 7,093,179 | B2 | 8/2006 | Shea |
| 7,117,427 | B2 | 10/2006 | Ophir |
| 7,133,228 | B2 | 11/2006 | Fung |
| 7,184,486 | B1 | 2/2007 | Wu |
| 7,191,378 | B2 | 3/2007 | Eroz |
| 7,203,887 | B2 | 4/2007 | Eroz |
| 7,308,061 | B1 | 12/2007 | Huang |
| 7,310,768 | B2 | 12/2007 | Eidson |
| 7,313,750 | B1 | 12/2007 | Feng |
| 7,353,409 | B2 * | 4/2008 | Hartman et al. ............. 713/300 |
| 7,370,258 | B2 | 5/2008 | Iancu |
| 7,415,651 | B2 | 8/2008 | Argon |
| 7,502,189 | B2 | 3/2009 | Sawaguchi |
| 7,523,375 | B2 | 4/2009 | Spencer |
| 7,587,657 | B2 | 9/2009 | Haratsch |
| 7,590,168 | B2 | 9/2009 | Raghavan |
| 7,646,829 | B2 | 1/2010 | Ashley |
| 7,702,986 | B2 | 4/2010 | Bjerke |
| 7,752,523 | B1 | 7/2010 | Chaichanavong |
| 7,779,325 | B2 | 8/2010 | Song |
| 7,800,812 | B2 * | 9/2010 | Moskowitz ................... 359/296 |
| 7,802,172 | B2 | 9/2010 | Vila Casado et al. |
| 7,952,824 | B2 | 5/2011 | Dziak |
| 7,958,425 | B2 | 6/2011 | Chugg |
| 7,996,746 | B2 | 8/2011 | Livshitz |
| 8,018,360 | B2 | 9/2011 | Nayak |
| 8,201,051 | B2 | 6/2012 | Tan |
| 8,237,597 | B2 | 8/2012 | Liu |
| 8,261,171 | B2 | 9/2012 | Annampedu |
| 8,291,284 | B2 | 10/2012 | Savin |
| 8,295,001 | B2 | 10/2012 | Liu |
| 2008/0069373 | A1 | 3/2008 | Jiang |
| 2008/0304558 | A1 | 12/2008 | Zhu et al. |
| 2009/0132893 | A1 | 5/2009 | Miyazaki |
| 2009/0185643 | A1 | 7/2009 | Fitzpatrick |
| 2011/0167227 | A1 * | 7/2011 | Yang et al. ..................... 711/154 |
| 2011/0205653 | A1 * | 8/2011 | Mathew et al. ................. 360/31 |
| 2011/0209026 | A1 * | 8/2011 | Xia et al. ....................... 714/752 |
| 2011/0264987 | A1 | 10/2011 | Li |
| 2012/0060170 | A1 * | 3/2012 | Vajda ............................ 718/104 |
| 2012/0124118 | A1 | 5/2012 | Ivkovic |
| 2012/0182643 | A1 | 7/2012 | Zhang |
| 2012/0207201 | A1 | 8/2012 | Xia |
| 2012/0212849 | A1 | 8/2012 | Xu |
| 2012/0262814 | A1 | 10/2012 | Li |
| 2012/0265488 | A1 | 10/2012 | Sun |

OTHER PUBLICATIONS

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of Gf(2rn) LDPC Decoders", IEEE Transactions on Circuits and Systemssi: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

U.S. Appl. No. 13/227,544, Unpublished (filed Sep. 8, 2011) (Shaohua Yang).

U.S. Appl. No. 13/239,683, Unpublished (filed Sep. 22, 2011) (Changyou Xu).

U.S. Appl. No. 13/186,234, Unpublished (filed Jul. 19, 2011) (Haitao Xia).

U.S. Appl. No. 13/213,751, Unpublished (filed Aug. 19, 2011) (Fan Zhang).

U.S. Appl. No. 13/283,549, Unpublished (filed Oct. 27, 2011) (Wu Chang).

U.S. Appl. No. 13/269,832, Unpublished (filed Oct. 10, 2011) (Haitao Xia).

U.S. Appl. No. 13/300,078, Unpublished (filed Nov. 18, 2011) (Chung-Li Wang).

U.S. Appl. No. 13/302,119, Unpublished (filed Nov. 22, 2011) (Lei Chen).

U.S. Appl. No. 13/305,510, Unpublished (filed Nov. 28, 2011) (Lei Chen).

U.S. Appl. No. 13/227,416, Unpublished (filed Sep. 7, 2011) (Lei Chen).

U.S. Appl. No. 13/305,551, Unpublished (filed Nov. 28, 2011) (Yang Han).

U.S. Appl. No. 13/296,022, Unpublished (filed Nov. 14, 2011) (Victor Krachkovsky).

U.S. Appl. No. 13/174,537, Unpublished (filed Jun. 30, 2011) (Anantha Raman Krishnan).

U.S. Appl. No. 13/174,453, Unpublished (filed Jun. 30, 2011) (Johnson Yen).

U.S. Appl. No. 13/180,495, Unpublished (filed Jul. 11, 2011) (Chung-Li Wang).

U.S. Appl. No. 13/295,150, Unpublished (filed Nov. 14, 2011) (Zongwang Li).

U.S. Appl. No. 13/269,852, Unpublished (filed Oct. 10, 2011) (Haitao Xia).

U.S. Appl. No. 13/171,615, Unpublished (filed Jun. 29, 2011) (Bradley D. Seago).

U.S. Appl. No. 13/113,219, Unpublished (filed May 23, 2011) (Yang Han).

(56) References Cited

OTHER PUBLICATIONS

U.S. Appl. No. 13/284,767, Unpublished (filed Oct. 28, 2011) (Fan Zhang).

U.S. Appl. No. 13/284,730, Unpublished (filed Oct. 28, 2011) (Fan Zhang).

Vasic, B., "High-Rate Girth-Eight Codes on Rectangular Integer Lattices", IEEE Trans. Communications, vol. 52, Aug. 2004, pp. 1248-1252.

Vasic, B., "High-Rate Low-Density Parity-Check Codes Based on Anti-Pasch Affine Geometries," Proc ICC 2002, pp. 1332-1336.

Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.

Yeo et al., "VLSI Architecture for Iterative Decoders in Magnetic Storage Channels", Mar. 2001, pp. 748-755, IEEE trans. Magnetics, vol. 37, No. 2.

Zhang et al., "Analysis of Verification-Based Decoding on the q-ary Symmetric Channel for Large q", IEEE Trans. on Information Theory, vol. 57, No. 10 (Oct. 2011).

Zhong et al., "Joint Code-Encoder Design for LDPC Coding System VLSI Implementation", ISCAS, IEEE, pp. 389-392, May 2004.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong, "Block-LDPC: A Practical LDPC Coding System Design Approach", IEEE Trans. on Circuits, Regular Papers, vol. 5, No. 4, pp. 766-775, Apr. 2005.

\* cited by examiner

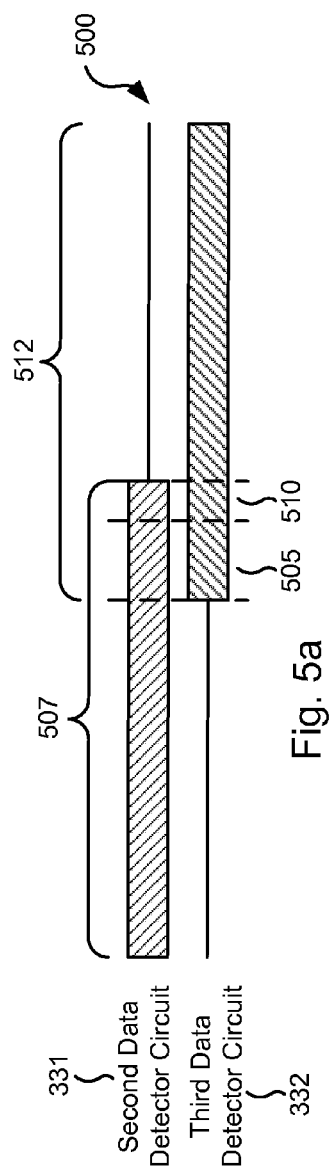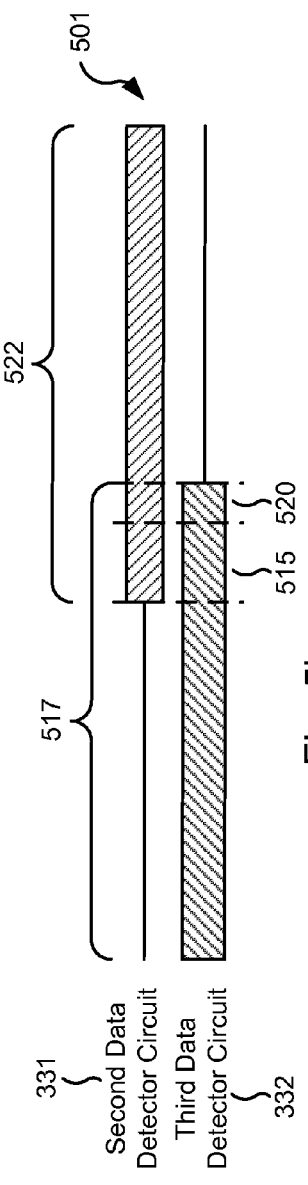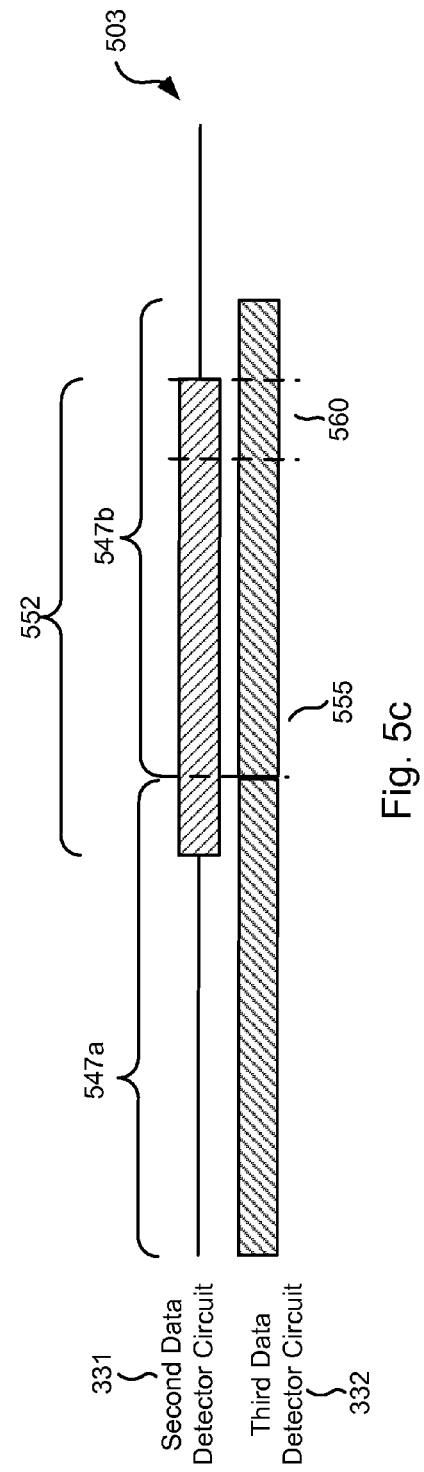

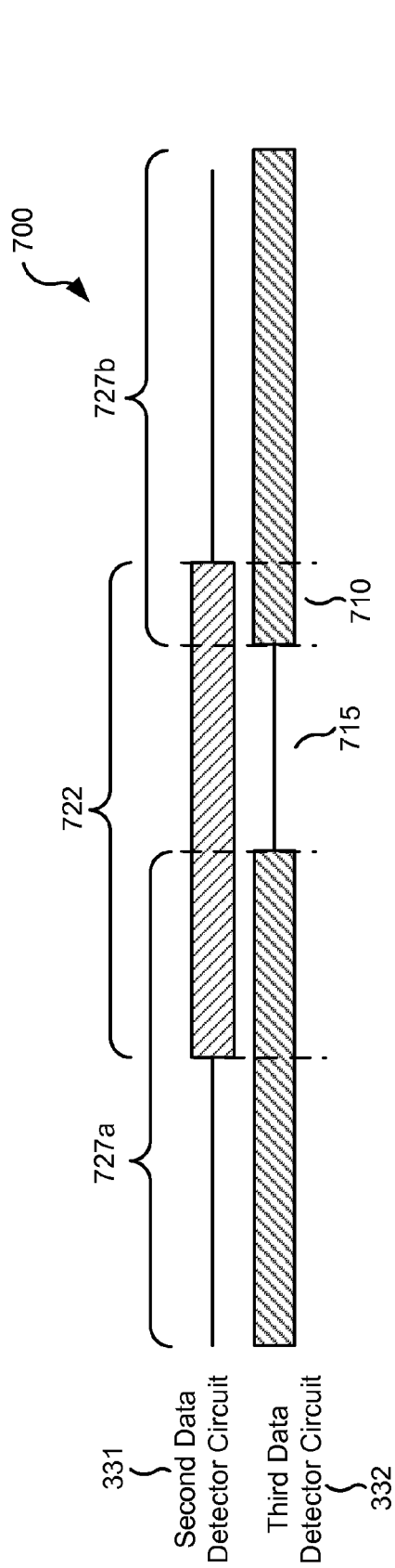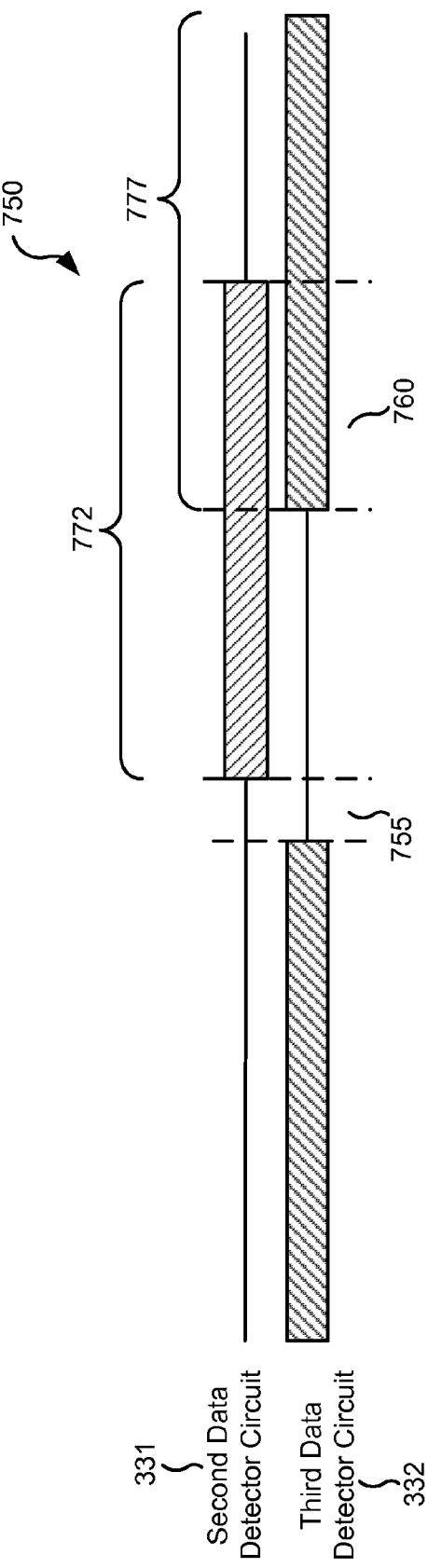

SYSTEMS AND METHODS FOR SCALABLE DATA PROCESSING SHUT DOWN

BACKGROUND OF THE INVENTION

The present inventions are related to systems and methods for data processing, and more particularly to systems and methods for power governance in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations depending upon the characteristics of the data being processed. The variable number of processing iterations result in ambiguity in determining circuit power requirements, and can require the choice of an expensive packaging designed to dissipate power at a higher rate than may actually be required.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for power governance in a data processing system.

Various embodiments of the present invention provide data processing systems that include: a first data detector circuit, a second data detector circuit, and a data detector control circuit. The data detector control circuit is operable to: select one of the first data detector circuit and the second data detector circuit to apply a data detection algorithm to the data set; assign the data set to the selected one of the first data detector circuit and the second data detector circuit; determine an overlap between operation of the first data detector circuit and the second data detector circuit; and provide a command indicating a period for operation by the selected one of the first data detector circuit and the second data detector circuit. The period of operation is based at least in part on the overlap.

In some instances of the aforementioned embodiments, the data detector control circuit is further operable to compare the overlap with a threshold value. In some cases, the threshold value is user programmable. In various instances of the aforementioned embodiments, the period for operation begins immediately when the overlap is less than the threshold value. In other instances of the aforementioned embodiments, the period for operation begins after a non-zero delay when the overlap is greater than the threshold value. In some such instances, the non-zero delay plus the overlap is at least as large as the threshold value. In one or more cases, for an output period corresponding to the non-zero delay, the selected one of the first data detector circuit and the second data detector circuit is not providing a detected output. In other cases, for an output period corresponding to the non-zero delay, the selected one of the first data detector circuit and the second data detector circuit is operable to provide corresponding values from the data set as part of the detected output. In one particular case, the data processing system further includes a data decoder circuit operable to apply a data decode algorithm to a decoder input to yield a decoded output. In such cases, the data set is derived from the decoded output. The data decoder circuit may be, but is not limited to, a low density parity check decoder circuit.

In various instances of the aforementioned embodiments, the data detection algorithm may be, but is not limited to, a maximum a posteriori data detection algorithm, or a Viterbi data detection algorithm. In some instances of the aforementioned embodiments, the system is implemented as an integrated circuit. In one or more instances of the aforementioned embodiments, the data processing system is incorporated in a device that may be, but is not limited to, a storage device, or a data transmission device.

Other embodiments of the present invention provide methods for data processing. Such methods include: providing a first data detector circuit; providing a second data detector circuit; selecting one of the first data detector circuit and the second data detector circuit to apply a data detection algorithm to the data set; assigning the data set to the selected one of the first data detector circuit and the second data detector circuit; determining an overlap between operation of the first data detector circuit and the second data detector circuit; and providing a command indicating a period for operation by the selected one of the first data detector circuit and the second data detector circuit. The period of operation is based at least in part on the overlap.

In some instances of the aforementioned embodiments, the methods further include comparing the overlap with a threshold value such that the period for operation begins immediately when the overlap is less than the threshold value. In other instances of the aforementioned embodiments, the methods further include comparing the overlap with a threshold value such that the period for operation begins after a non-zero delay when the overlap is greater than the threshold value. In some case, for an output period corresponding to the non-zero delay, the selected one of the first data detector circuit and the second data detector circuit is not providing a detected output. In other cases, for an output period corresponding to the non-zero delay, the selected one of the first data detector circuit and the second data detector circuit is operable to provide corresponding values from the data set as part of the detected output. In some cases, the methods further include applying a data decode algorithm to a decoder input to yield a decoded output, wherein the data set is derived from the decoded output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 5a-5c graphically show various detector overlaps and data reuse periods that may occur during use of the systems and methods of the present invention;

FIGS. 7a-7b graphically show various detector overlaps and detector start delays that may occur during use of the systems and methods of the present invention.

DETAILED DESCRIPTION OF THE INVENTION

The present inventions are related to systems and methods for data processing, and more particularly to systems and methods for power governance in a data processing system.

Various embodiments of the present invention provide for power governance in a variable data processing system. As an example, a variable data processing system may include two or more data detector circuits in parallel and a data decoder circuit through which data is passed in an attempt to recover the original data. Depending upon characteristics of the received data, the data may pass a variable number of times through both one of the data detector circuits and the data decoder circuit (i.e., a global iteration), may pass a variable number of times through the data decoder circuit (i.e., a local iteration) during each global iteration before being passed on to one of the data detector circuits for an additional global iteration. A detector processing overlap monitor and control circuit schedules operation of the data detector circuits to avoid over-power scenarios such as, for example, overheating and/or over-current conditions.

Figure 1:
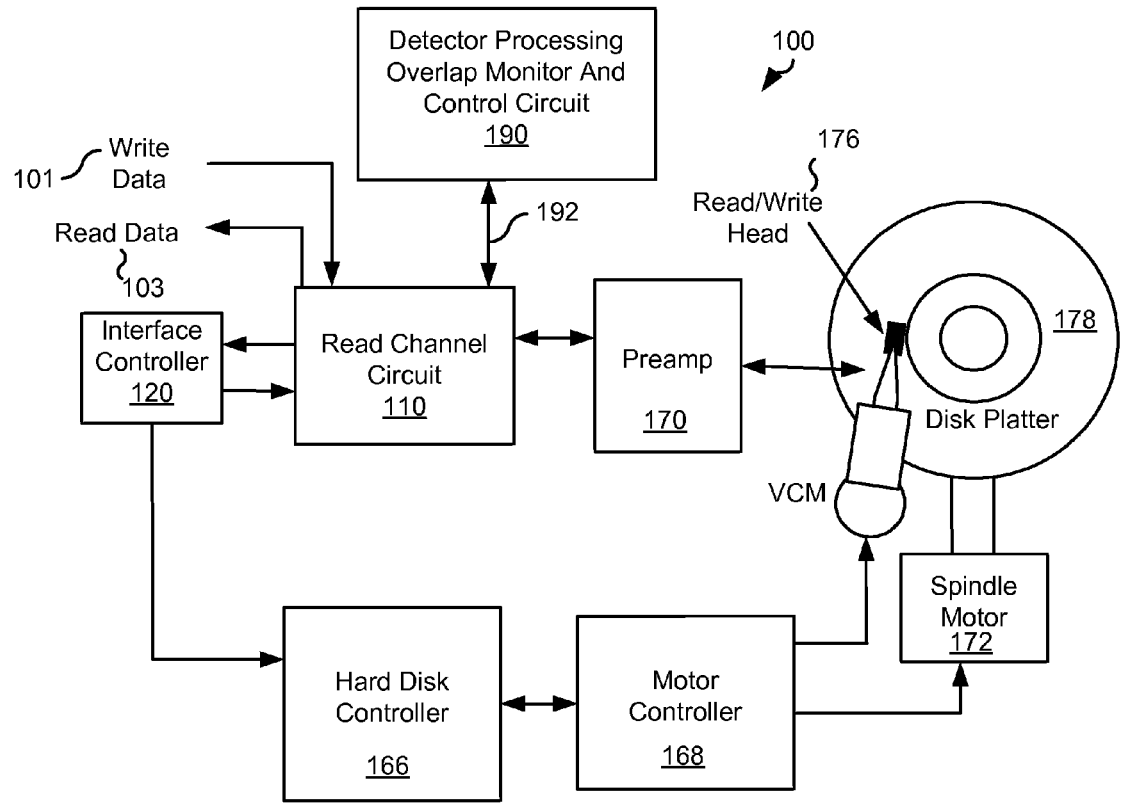
FIG. 1 shows a storage system including a detector processing overlap monitor and control circuit in accordance with various embodiments of the present invention.

Turning to FIG. 1, a storage system 100 including a read channel circuit 110 communicating with a detector processing overlap monitor and control circuit 190 is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 476. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172.

The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 utilizes a variable data processing circuit that allows different chunks of data to utilize different amounts of processing bandwidth depending, for example, upon the signal to noise ratio exhibited by a received data set. The processing bandwidth is distributed between two or more data detector circuits, at least one data decoder circuit, and the associated memories. Status signals 192 (e.g., idle/busy, enable) are provided between detector processing overlap monitor and control circuit 190 and read channel circuit 110. Detector processing overlap monitor and control circuit 190 determines whether an overlap of operation between the two or more data detector circuits exceeds a maximum threshold. Where it is determined that the overlap exceeds the maximum threshold, detector processing overlap monitor and control circuit 190 adjusts operation of one or more of the data detector circuits to avoid an over-power scenario. Read channel circuit 110 may be implemented to include a data processing circuit similar to that discussed below in relation to FIG. 3. Further, the adjustment to the operation of one or more of the data detector circuits may be done consistent with the approach discussed below in relation to FIG. 4 and/or the approach discussed below in relation to FIG. 6.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 2:
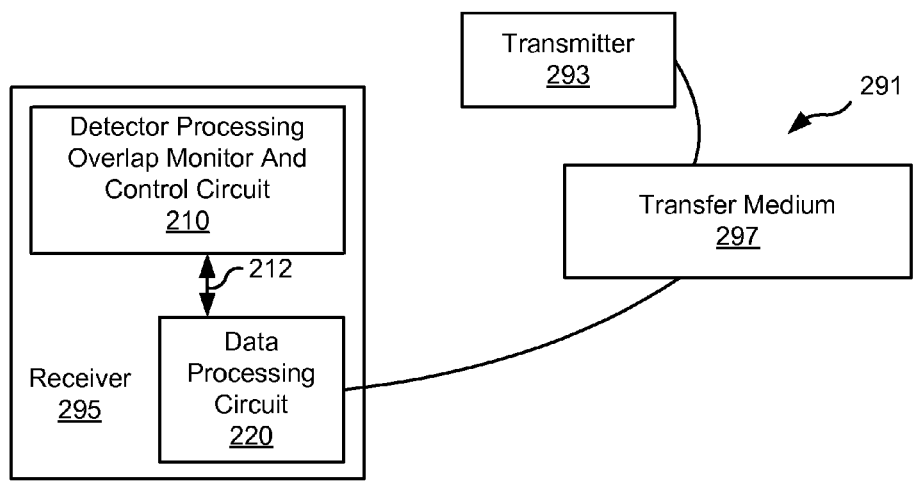
FIG. 2 depicts a data transmission system including a detector processing overlap monitor and control circuit in accordance with one or more embodiments of the present invention.

Turning to FIG. 2, a data transmission system 200 including a detector processing overlap monitor and control circuit 210 is shown in accordance with one or more embodiments of the present invention. Data transmission system 200 includes a transmitter 293 that is operable to transmit encoded information via a transfer medium 297 as is known in the art. The encoded data is received from transfer medium 297 by a receiver 295. Receiver 295 includes a data processing circuit 220, a detector processing overlap monitor and control circuit 210, and event monitor and control 230. Data processing circuit 220 is a variable data processing circuit that allows different chunks of data to utilize different amounts of processing bandwidth depending, for example, upon the signal to noise ratio exhibited by a received data set. The processing bandwidth is distributed between at least two data detector circuits, at least one data decoder circuit, and the associated memories. Status signals 212 (e.g., idle/busy, enable) are provided between a detector processing overlap monitor and control circuit 210 and data processing circuit 220. Detector processing overlap monitor and control circuit 210 determines whether an overlap of operation between the two or more data detector circuits exceeds a maximum threshold. Where it is determined that the overlap exceeds the maximum threshold, detector processing overlap monitor and control circuit 210 adjusts operation of one or more of the data detector circuits to avoid an over-power scenario. Data processing circuit 220 may be implemented to include a data processing circuit similar to that discussed below in relation to FIG. 3. Further, the adjustment to the operation of one or more of the data detector circuits may be done consistent with the approach discussed below in relation to FIG. 4 and/or the approach discussed below in relation to FIG. 6.

Figure 3:
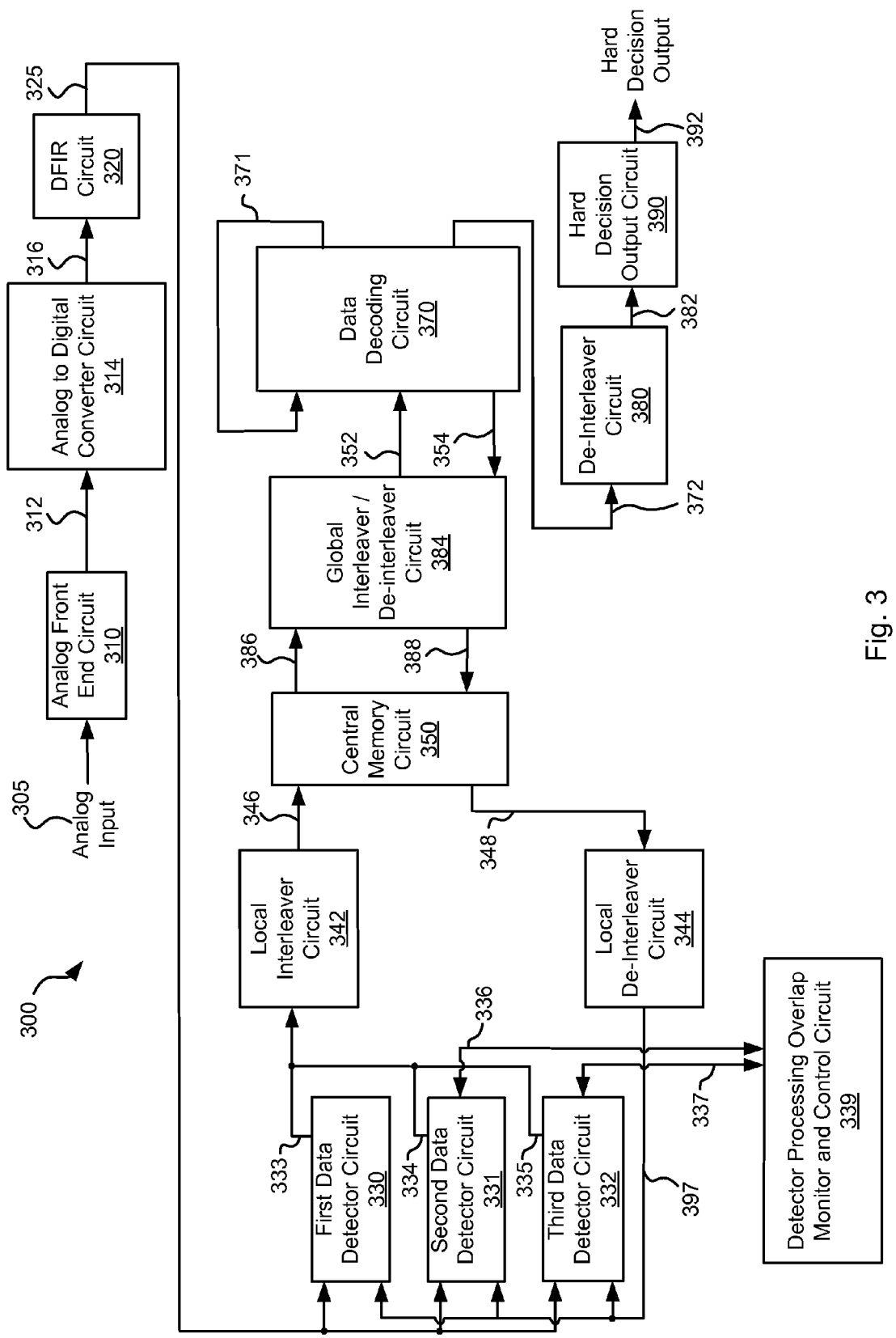
FIG. 3 shows a data processing circuit including a detector processing overlap monitor and control circuit in accordance with some embodiments of the present invention.

FIG. 3 shows a data processing circuit 300 including a detector processing overlap monitor and control circuit 339 in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. In some cases, equalizer 320 includes sufficient memory to maintain one or more codewords at least until one of a first data detector circuit 330, a second data detector circuit 331, or a data detector circuit 332 is available for processing. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input.

Each of first data detector circuit 330, second data detector circuit 331, and third data detector circuit 332 is operable to apply a data detection algorithm to a received codeword or data set. In some embodiments of the present invention, each of first data detector circuit 330, second data detector circuit 331, and third data detector circuit 332 is a Viterbi algorithm data detector circuit as are known in the art. In other embodiments of the present invention, each of first data detector circuit 330, second data detector circuit 331, and third data detector circuit 332 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, first data detector circuit 330 is used to apply the data detection algorithm to the received codeword for the first global iteration applied to the received codeword, and one of second data detector circuit 331 or third data detector circuit 332 is operable apply the data detection algorithm to the received codeword guided by a decoded output accessed from a central memory circuit 350 on subsequent global iterations.

Upon completion of application of the data detection circuit to the received codeword on the first global iteration, first data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once a data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass trough data decoder circuit 370) is desired, data decoding circuit 370 re-applies the data decode algorithm to decoder input 352 guided by decoded output 371. This continues until either a maximum number of local iterations is exceeded or decoded output 371 converges.

Where decoded output 371 fails to converge (i.e., fails to yield the originally written data set) and a number of local iterations through data decoder circuit 370 exceeds a threshold, the resulting decoded output is provided as a decoded output 354 back to central memory circuit 350 where it is stored awaiting another global iteration through one of second data detector circuit 331 or third data detector circuit 332, and data decoding circuit 370. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352.

Detector processing overlap monitor and control circuit 339 schedules one of second data detector circuit 331 or third data detector circuit 332 to re-apply the data detection algorithm to the received codeword guided by a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to the scheduled one of first data detector circuit 331 or second data detector circuit 332 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

Detector processing overlap monitor and control circuit 339 schedules one of second data detector circuit 331 or third data detector circuit 332 based upon a scheduling algorithm. The scheduling algorithm relies on information included as status and control signals 337 and status and control signals 336 between detector processing overlap monitor and control circuit 339 and second data detector circuit 331 or third data detector circuit 332. The scheduling algorithm is imposed using control signals from detector processing overlap monitor and control circuit 339 to second data detector circuit 331 or third data detector circuit 332.

In some embodiments of the present invention, detector processing overlap monitor and control circuit 339 determines whether one of second data detector circuit 331 or third data detector circuit 332 is available. Where one of second data detector circuit 331 or third data detector circuit 332 is available, it is assigned to receive a decoded output pending in central memory circuit 350. In addition, it is determined whether the overlap in operation by second data detector circuit 331 and third data detector circuit 332 exceeds a maximum overlap. Where a maximum overlap is not exceeded, then the selected one of second data detector circuit 331 or third data detector circuit 332 proceeds to apply the data detection algorithm without modification. Alternatively, where a maximum overlap is exceeded, then the selected one of second data detector circuit 331 or third data detector circuit 332 provides a detected output (either detected output 334 or detected output 335) that includes a portion of de-interleaved output 397 inserted therein and corresponding with a period sufficient to reduce the operational overlap between operation of second data detector circuit 331 and third data detector circuit 332 to less than the maximum overlap. For a period corresponding to the portion of the provided detected output where de-interleaved output 397 is inserted, the selected one of second data detector circuit 331 or third data detector circuit 332 is not processing and thus operating at a substantially reduced power state. In some cases, the aforementioned approach operates consistent with that discussed below in relation to FIGS. 4a-4b.

In other embodiments of the present invention, detector processing overlap monitor and control circuit 339 determines whether one of second data detector circuit 331 or third data detector circuit 332 is available, and where an overlap between operational periods of the two detectors exceeds a maximum, operation of one of the data detector circuits is moved in time. Thus, the amount of overlap can be reduced to less than the maximum overlap. In some cases, the aforementioned approach operates consistent with that discussed below in relation to FIGS. 6a-6b.

Figure 4A:
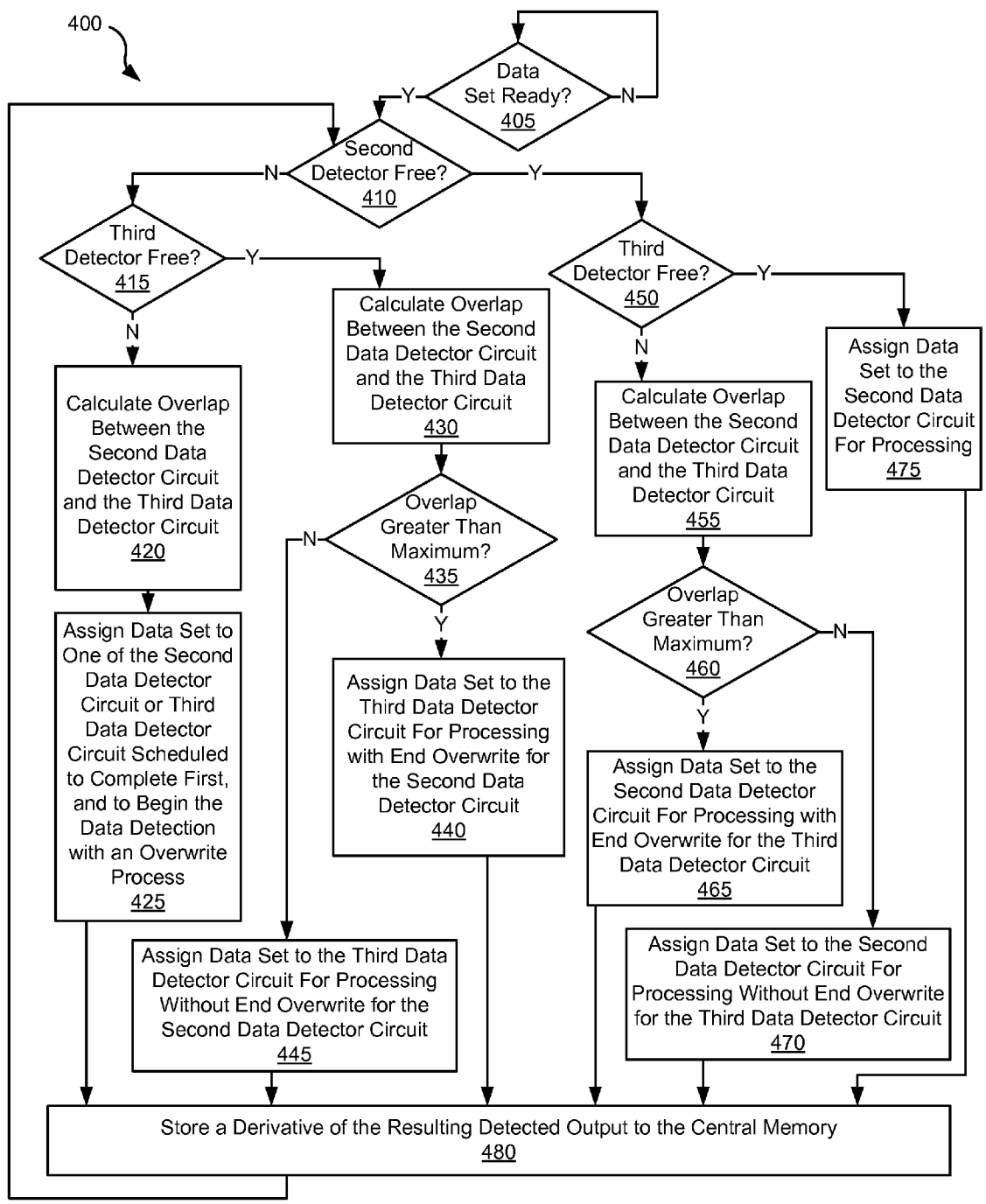
FIGS. 4a-4b is a flow diagram showing a method in accordance with some embodiments of the present invention for mitigating over-power scenarios in a variable data processing system.
Figure 4B:
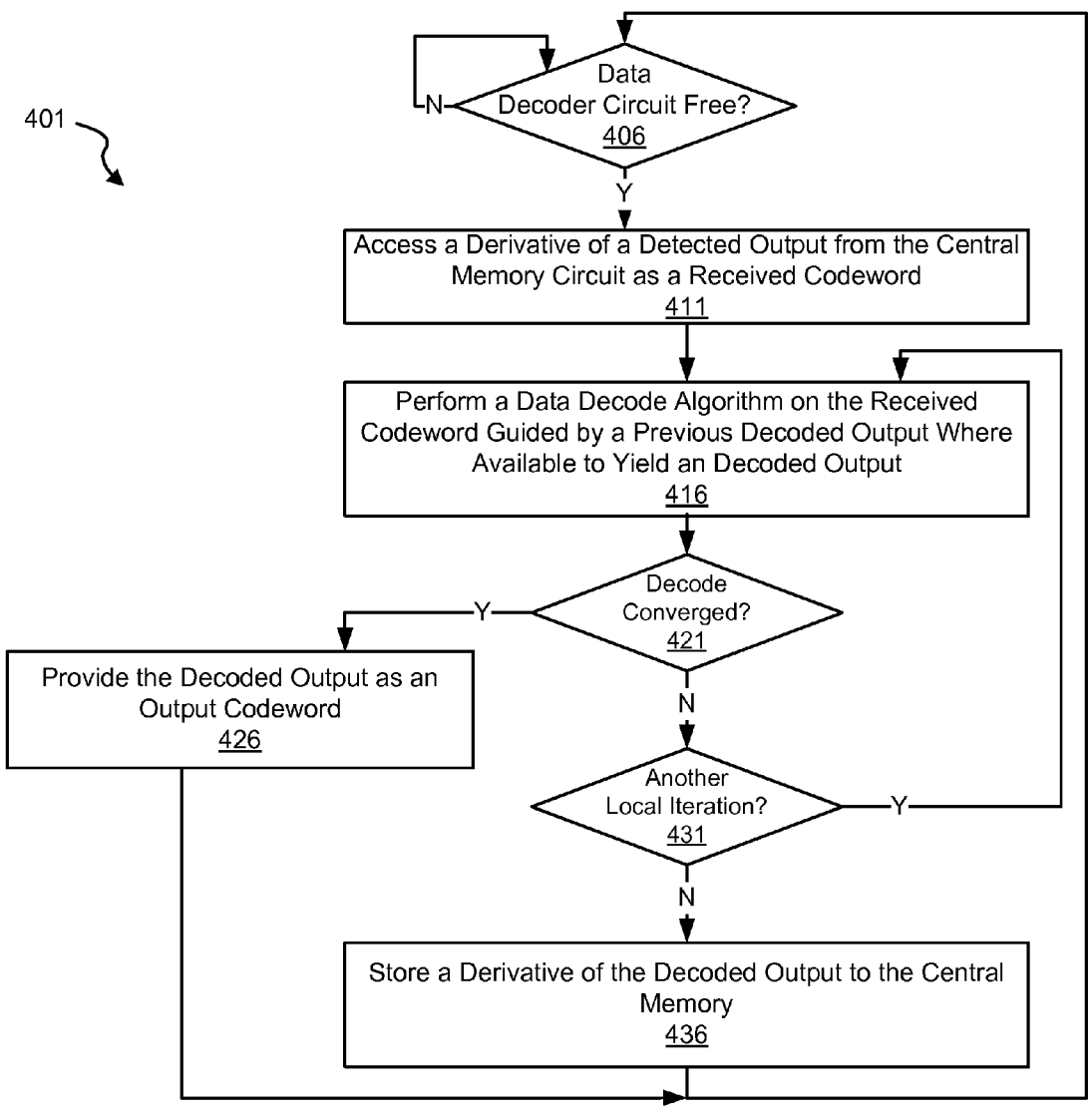

FIGS. 4a-4b provide flow diagrams 400, 401 showing a method in accordance with some embodiments of the present invention for mitigating over-power scenarios in a variable data processing system. Following flow diagram 400 of FIG. 4a, it is determined whether a data set is ready for application of a data detection algorithm (block 405). In some cases, a data set is ready when it is received from a data decoder circuit via a central memory circuit. The data set may be, for example, a de-interleaved version of a decoded output from a data decoder circuit. Where a new data set is ready (block 405), one of a second data detector circuit or a third data detector circuit is selected to perform a subsequent data detection on the data input. This includes determining whether the second data detector circuit is available (block 410).

Where the second data detector circuit is not available (i.e., the second data detector circuit is busy) (block 410), it is determined whether the third data detector circuit is available (block 415). Where the third data detector is not available (i.e., the third data detector circuit is busy) (block 415), an overlap between the second data detector circuit and the third data detector circuit is calculated (block 420). In this case, it is determined whether the second data detector circuit or third data detector circuit is scheduled to complete processing first. The data set is assigned to the data detector circuit that is scheduled to complete first with a command for the selected data detector circuit to begin providing a portion of the data set (e.g., a portion of de-interleaved output 397) as a detected output from the selected data detector circuit, and to begin processing a received codeword guided by the data set at a point in time where an operational overlap between the second data detector circuit and the third data detector circuit will not exceed a maximum allowable overlap (block 425). The resulting detected output which in this case includes initial data that is pulled from the data set from the central memory circuit and a portion of data resulting from application of the data detection algorithm is provided. This resulting detected output is further processed (e.g., interleaved or shuffled) before a derivative of the detected output is stored to the central memory (block 480).

FIG. 5c is a timing diagram 503 showing such a situation where both the second data detector circuit 331 and the third data detector circuit 332 are currently both busy (i.e., an overlap between a period 547a and a period 552). In this case, a newly received data set is assigned to the third data detector circuit 332 for application of the data detection algorithm. During a beginning period 555 (i.e., a period of overlap between the operation of the second data detector circuit, period 552, and the operation of the third data detector circuit 332, a period 547b, less a maximum overlap 560), the third data detector circuit 332 is not applying the data detection algorithm to the received data set, but rather passing the received data set on unprocessed as part of the detected output. After beginning period 555, the third data detector circuit 332 begins processing the data set to yield a processed output that is included in the detected output.

Returning to FIG. 4a, alternatively where the third data detector is available (block 415), an expected overlap between the second data detector circuit and the third data detector circuit is calculated (block 430). It is determined whether the calculated overlap is greater than a maximum allowable overlap (block 435). Where the overlap is not greater than the maximum (block 435), then the data set is assigned to the third data detector circuit for processing without requiring any overwrite using previously processed data (block 445). Application of the data detection algorithm to the data set by the third data detector circuit yields a detected output. This resulting detected output is further processed (e.g., interleaved or shuffled) before a derivative of the detected output is stored to the central memory (block 480).

Alternatively, where the overlap is greater than the maximum (block 435), then the data set is assigned to the third data detector circuit for processing with a command to require an overwrite using previously processed data at the end of the ongoing processing of the second data detector circuit (block 440). In this case, application of the data detection algorithm to a data set currently being processed by the second data detector circuit yields a detected output. The detected output includes the results of applying the data detection algorithm by the second data detector circuit along with data that is pulled from the data set being processed by the second data detector circuit from the central memory circuit. This resulting detected output is further processed (e.g., interleaved or shuffled) before a derivative of the detected output is stored to the central memory (block 480).

FIG. 5a is a timing diagram 500 showing such a situation where the second data detector circuit 331 is initially busy (represented by a period 507) while the third data detector circuit 332 is available. The third data detector circuit 332 is assigned to apply the data detection algorithm to the newly received data set. Operation of the third data detector circuit 332 corresponds to a period 512. A maximum allowable overlap period 505 is shown. Preceding and during maximum overlap period 505, the second data detector circuit 331 provides currently processed data (i.e., data resulting from a current application of the data detection algorithm by the second data detector circuit). In contrast, during an excessive period 510 (i.e., a period during which both the second data detector circuit and third data detector circuit are operating beyond the maximum allowable overlap period 505), the second data detector circuit 331 stops applying the data detection algorithm to the data set on which it was operating and in place of currently processed data, the second data detector circuit 331 provides corresponding data from a previously processed version of the data set on which the second data detector circuit 331 is operating.

Turning again to FIG. 4a, where the second data detector circuit is available (block 410), it is determined whether the third data detector circuit is available (block 450). Where the third data detector is available (block 450), the data set is assigned to the second data detector circuit for processing (block 475). This processing results in a detected output being provided by the second data detector circuit. This detected output is further processed (e.g., interleaved or shuffled) before a derivative of the detected output is stored to the central memory (block 480).

Alternatively, where the third data detector is available (block 450), an expected overlap between the second data detector circuit and the third data detector circuit is calculated (block 455). It is determined whether the calculated overlap is greater than a maximum allowable overlap (block 460). Where the overlap is not greater than the maximum (block 460), then the data set is assigned to the second data detector circuit for processing without requiring any overwrite using previously processed data (block 470). Application of the data detection algorithm to the data set by the second data detector circuit yields a detected output. This resulting detected output is further processed (e.g., interleaved or shuffled) before a derivative of the detected output is stored to the central memory (block 480).

Alternatively, where the overlap is greater than the maximum (block 460), then the data set is assigned to the second data detector circuit for processing with a command to require an overwrite using previously processed data at the end of the ongoing processing of the third data detector circuit (block 465). In this case, application of the data detection algorithm to a data set currently being processed by the second data detector circuit yields a detected output. The detected output includes the results of applying the data detection algorithm by the third data detector circuit along with data that is pulled from the data set being processed by the third data detector circuit from the central memory circuit. This resulting detected output is further processed (e.g., interleaved or shuffled) before a derivative of the detected output is stored to the central memory (block 480).

FIG. 5b is a timing diagram 501 showing such a situation where the third data detector circuit 332 is initially busy (represented by a period 517) while the second data detector circuit 331 is available. The second data detector circuit 331 is assigned to apply the data detection algorithm to the newly received data set. Operation of the second data detector circuit 331 corresponds to a period 522. A maximum allowable overlap period 515 is shown. Preceding and during maximum overlap period 515, the third data detector circuit 332 provides currently processed data (i.e., data resulting from a current application of the data detection algorithm by the second data detector circuit). In contrast, during an excessive period 520 (i.e., a period during which both the second data detector circuit and third data detector circuit are operating beyond the maximum allowable overlap period 515), the third data detector circuit 332 stops applying the data detection algorithm to the data set on which it was operating and in place of currently processed data, the third data detector circuit 332 provides corresponding data from a previously processed version of the data set on which the third data detector circuit 332 is operating.

Following flow diagram 401 of FIG. 4b, it is determined whether the data decoder circuit is free (block 406). The data decoder circuit may be, for example, a low density data decoder circuit as are known in the art. Where the data decoder circuit is available (block 406), a previously stored derivative of a detected output is accessed from the central memory and used as a received codeword (block 411). A data decode algorithm is applied to the received codeword to yield a decoded output (block 416). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 421). Where the decoded output converged (block 421), it is provided as a decoded output (block 426). Alternatively, where the decoded output failed to converge (block 421), it is determined whether another local iteration is desired (block 431). In some cases, four local iterations are allowed. Based upon the disclosure provided herein, one of ordinary skill in the art will recognize another number of local iterations that may be used in relation to different embodiments of the present invention. Where another local iteration is desired (block 431), the processes of blocks 406-431 are repeated for the codeword. Alternatively, where another local iteration is not desired (block 431), a derivative of the decoded output is stored to the central memory (block 436). The derivative of the decoded output being stored to the central memory triggers the data set ready query of block 405 to begin the data detection process.

Figure 6A:
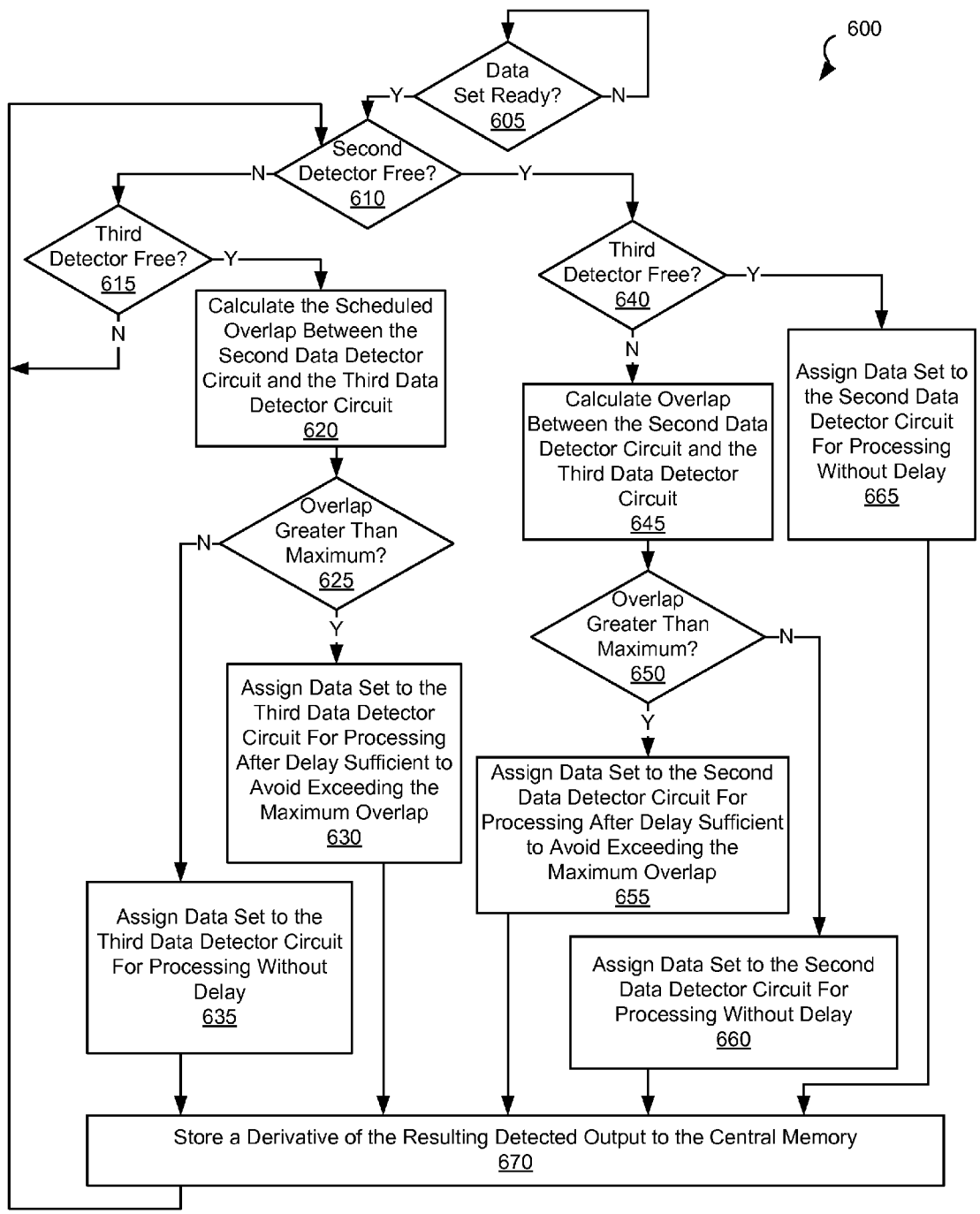
FIGS. 6a-6b is a flow diagram showing a method in accordance with other embodiments of the present invention for mitigating over-power scenarios in a variable data processing system.
Figure 6B:
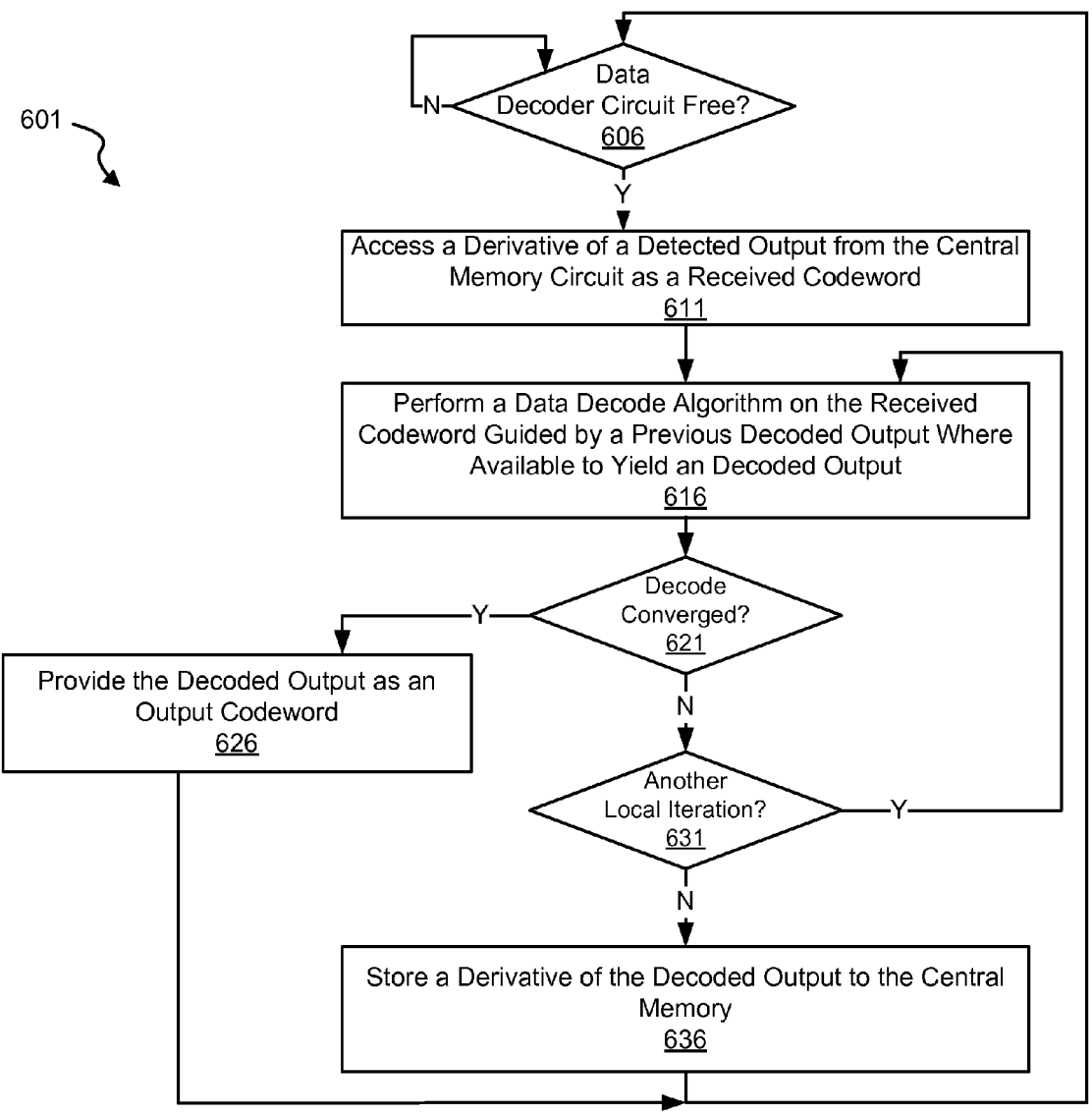

Turning to FIGS. 6a-6b, flow diagram 600, 601 show a method in accordance with other embodiments of the present invention for mitigating over-power scenarios in a variable data processing system. Following flow diagram 600 of FIG. 6a, it is determined whether a data set is ready for application of a data detection algorithm (block 605). In some cases, a data set is ready when it is received from a data decoder circuit via a central memory circuit. The data set may be, for example, a de-interleaved version of a decoded output from a data decoder circuit (i.e., a de-interleaved version of the data stored to the central memory via block 636 of FIG. 6b). Where a new data set is ready (block 605), one of a second data detector circuit or a third data detector circuit is selected to perform a subsequent data detection on the data input. This includes determining whether the second data detector circuit is available (block 610).

Where the second data detector circuit is not available (i.e., the second data detector circuit is busy) (block 610), it is determined whether the third data detector circuit is available (block 615). Where the third data detector circuit is not available (i.e., the third data detector circuit is busy) (block 615), the received data set remains unassigned until one of the second data detector circuit or third data detector circuit completes its current processing and becomes available. Alternatively, where the third data detector circuit is available (block 615), an overlap between the scheduled processing of the second data detector circuit and the third data detector circuit is calculated (block 620). It is then determined whether the calculated overlap is greater than a maximum allowable overlap (block 625). Where the overlap is not greater than the maximum (block 625), the data set is assigned to the third data detector circuit for processing without requiring any delay before processing begins (block 635). Application of the data detection algorithm to the data set by the third data detector circuit yields a detected output. This resulting detected output is further processed (e.g., interleaved or shuffled) before a derivative of the detected output is stored to the central memory (block 670).

FIG. 7a is a timing diagram 700 showing such a situation where the second data detector circuit 331 is initially busy (represented by a period 722) while the third data detector circuit 332 is available. The third data detector circuit 332 is assigned to apply the data detection algorithm to the newly received data set immediately where an overlap period 710 (i.e., an overlap of the processing of the second data detector circuit 331 represented by period 722 and the processing of the third data detector circuit 332 represented by a period 727b) is less than or equal to a maximum allowable overlap. Overlap period 710 is less than the maximum allowable because of an inherent delay 715 between processing periods (i.e., periods 727a, 727b) of the third data detector circuit 332.

Returning to FIG. 6, alternatively where the overlap is greater than the maximum (block 625), then the data set is assigned to the third data detector circuit for processing with a command to delay the beginning of processing a sufficient period to avoid exceeding the maximum overlap (block 630). The delayed processing by the third data detector circuit yields a detected output. This resulting detected output is further processed (e.g., interleaved or shuffled) before a derivative of the detected output is stored to the central memory (block 670). As discussed below, FIG. 7b graphically depicts a similar scenario where a delay is enforced before starting processing of an assigned data detector circuit.

Alternatively, where the second data detector circuit is not available (i.e., the second data detector circuit is busy) (block 610), it is determined whether the third data detector circuit is available (block 640). Where the third data detector circuit is not available (i.e., the third data detector circuit is busy) (block 640), an overlap between the scheduled processing of the second data detector circuit and the third data detector circuit is calculated (block 645). It is then determined whether the calculated overlap is greater than a maximum allowable overlap (block 650). Where the overlap is not greater than the maximum (block 650), the data set is assigned to the second data detector circuit for processing without requiring any delay before processing begins (block 660). Application of the data detection algorithm to the data set by the second data detector circuit yields a detected output. This resulting detected output is further processed (e.g., interleaved or shuffled) before a derivative of the detected output is stored to the central memory (block 670). As discussed below, FIG. 7a graphically depicts a similar scenario where no delay is required before starting processing of an assigned data detector circuit.

Alternatively, where the overlap is greater than the maximum (block 650), the data set is assigned to the second data detector circuit for processing with a command to delay the beginning of processing a sufficient period to avoid exceeding the maximum overlap (block 655). The delayed processing by the second data detector circuit yields a detected output. This resulting detected output is further processed (e.g., interleaved or shuffled) before a derivative of the detected output is stored to the central memory (block 670).

FIG. 7b is a timing diagram 750 showing such a situation where the third data detector circuit 332 is initially busy (represented by a period 772) while the second data detector circuit 331 is available. The second data detector circuit 331 is assigned to apply the data detection algorithm to the newly received data set after a delay period 755 to assure that a later scheduled overlap period 760 (i.e., an overlap of the processing of the second data detector circuit 331 represented by period 772 and the processing of the third data detector circuit 332 represented by a period 777b) is less than or equal to a maximum allowable overlap.

Returning to FIG. 6, alternatively where the third data detector circuit is available (block 640), the data set is assigned to the second data detector circuit for processing without requiring any delay before processing begins (block 665). Application of the data detection algorithm to the data set by the second data detector circuit yields a detected output. This resulting detected output is further processed (e.g., interleaved or shuffled) before a derivative of the detected output is stored to the central memory (block 670).

Following flow diagram 601 of FIG. 6*b*, it is determined whether the data decoder circuit is free (block 606). The data decoder circuit may be, for example, a low density data decoder circuit as are known in the art. Where the data decoder circuit is available (block 606), a previously stored derivative of a detected output is accessed from the central memory and used as a received codeword (block 611). A data decode algorithm is applied to the received codeword to yield a decoded output (block 616). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 621). Where the decoded output converged (block 621), it is provided as a decoded output (block 626). Alternatively, where the decoded output failed to converge (block 621), it is determined whether another local iteration is desired (block 631). In some cases, four local iterations are allowed. Based upon the disclosure provided herein, one of ordinary skill in the art will recognize another number of local iterations that may be used in relation to different embodiments of the present invention. Where another local iteration is desired (block 631), the processes of blocks 606-631 are repeated for the codeword. Alternatively, where another local iteration is not desired (block 631), a derivative of the decoded output is stored to the central memory (block 636). The derivative of the decoded output being stored to the central memory triggers the data set ready query of block 605 to begin the data detection process.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for power monitoring. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a first data detector circuit;
    a second data detector circuit;
    a data detector control circuit operable to:
        select one of the first data detector circuit and the second data detector circuit to apply a data detection algorithm to the data set;
        assign the data set to the selected one of the first data detector circuit and the second data detector circuit;
        determine an overlap between operation of the first data detector circuit and the second data detector circuit; and
        provide a command indicating a period for operation by the selected one of the first data detector circuit and the second data detector circuit, wherein the period of operation is based at least in part on the overlap.

2. The data processing system of claim 1, wherein the data detector control circuit is further operable to compare the overlap with a threshold value.

3. The data processing system of claim 2, wherein the period for operation begins immediately when the overlap is less than the threshold value.

4. The data processing system of claim 2, wherein the period for operation begins after a non-zero delay when the overlap is greater than the threshold value.

5. The data processing system of claim 4, wherein the non-zero delay plus the overlap is at least as large as the threshold value.

6. The data processing system of claim 4, wherein for an output period corresponding to the non-zero delay, the selected one of the first data detector circuit and the second data detector circuit is not providing a detected output.

7. The data processing system of claim 4, wherein for an output period corresponding to the non-zero delay, the selected one of the first data detector circuit and the second data detector circuit is operable to provide corresponding values from the data set as part of the detected output.

8. The data processing system of claim 7, wherein the data processing system further comprises:
    a data decoder circuit operable to apply a data decode algorithm to a decoder input to yield a decoded output, and wherein the data set is derived from the decoded output.

9. The data processing system of claim 8, wherein the data decoder circuit is a low density parity check decoder circuit.

10. The data processing system of claim 1, wherein the data detection algorithm is selected from a group consisting of: a maximum a posteriori data detection algorithm, and a Viterbi data detection algorithm.

11. The data processing system of claim 1, wherein the system is implemented as an integrated circuit.

12. The data processing system of claim 1, wherein the data processing system is incorporated in a device selected from a group consisting of: a storage device, and a data transmission device.

13. The data processing system of claim 1, wherein the threshold value is user programmable.

14. A method for data processing, the method comprising:
    providing a first data detector circuit;
    providing a second data detector circuit;
    selecting one of the first data detector circuit and the second data detector circuit to apply a data detection algorithm to the data set;
    assigning the data set to the selected one of the first data detector circuit and the second data detector circuit;
    determining an overlap between operation of the first data detector circuit and the second data detector circuit; and
    providing a command indicating a period for operation by the selected one of the first data detector circuit and the second data detector circuit, wherein the period of operation is based at least in part on the overlap.

15. The method of claim 14, wherein the method further comprises:
comparing the overlap with a threshold value, wherein the period for operation begins immediately when the overlap is less than the threshold value.

16. The method of claim 14, wherein the method further comprises:
comparing the overlap with a threshold value, wherein the period for operation begins after a non-zero delay when the overlap is greater than the threshold value.

17. The method of claim 16, wherein for an output period corresponding to the non-zero delay, the selected one of the first data detector circuit and the second data detector circuit is not providing a detected output.

18. The method of claim 16, wherein for an output period corresponding to the non-zero delay, the selected one of the first data detector circuit and the second data detector circuit is operable to provide corresponding values from the data set as part of the detected output.

19. The method of claim 18, wherein the method further comprises:
applying a data decode algorithm to a decoder input to yield a decoded output, wherein the data set is derived from the decoded output.

20. A storage device, the storage device comprising:
a storage medium;
a head assembly disposed in relation to the storage medium and operable to provide a sensed signal corresponding to information on the storage medium;
a read channel circuit including:
an analog to digital converter circuit operable to sample an analog signal derived from the sensed signal to yield a series of digital samples;
an equalizer circuit operable to equalize the digital samples to yield a first data set;
a first data detector circuit operable to apply a data detection algorithm to the first data set to yield a first detected output;
a data decoder circuit operable to apply a data decode algorithm to a decoder input derived from the first detected output to yield a decoded output;
a second data detector circuit;
a third data detector circuit;
a data detector control circuit operable to:
select one of the second data detector circuit and the third data detector circuit to apply a data detection algorithm to the data set;
assign the data set to the selected one of the second data detector circuit and the third data detector circuit;
determine an overlap between operation of the second data detector circuit and the third data detector circuit; and
provide a command indicating a period for operation by the selected one of the second data detector circuit and the third data detector circuit, wherein the period of operation is based at least in part on the overlap.

* * * * *